Jan. 12, 1954  F. T. HOVEY  2,666,007
METHOD OF MAKING CURING BAGS
Filed Jan. 3, 1950
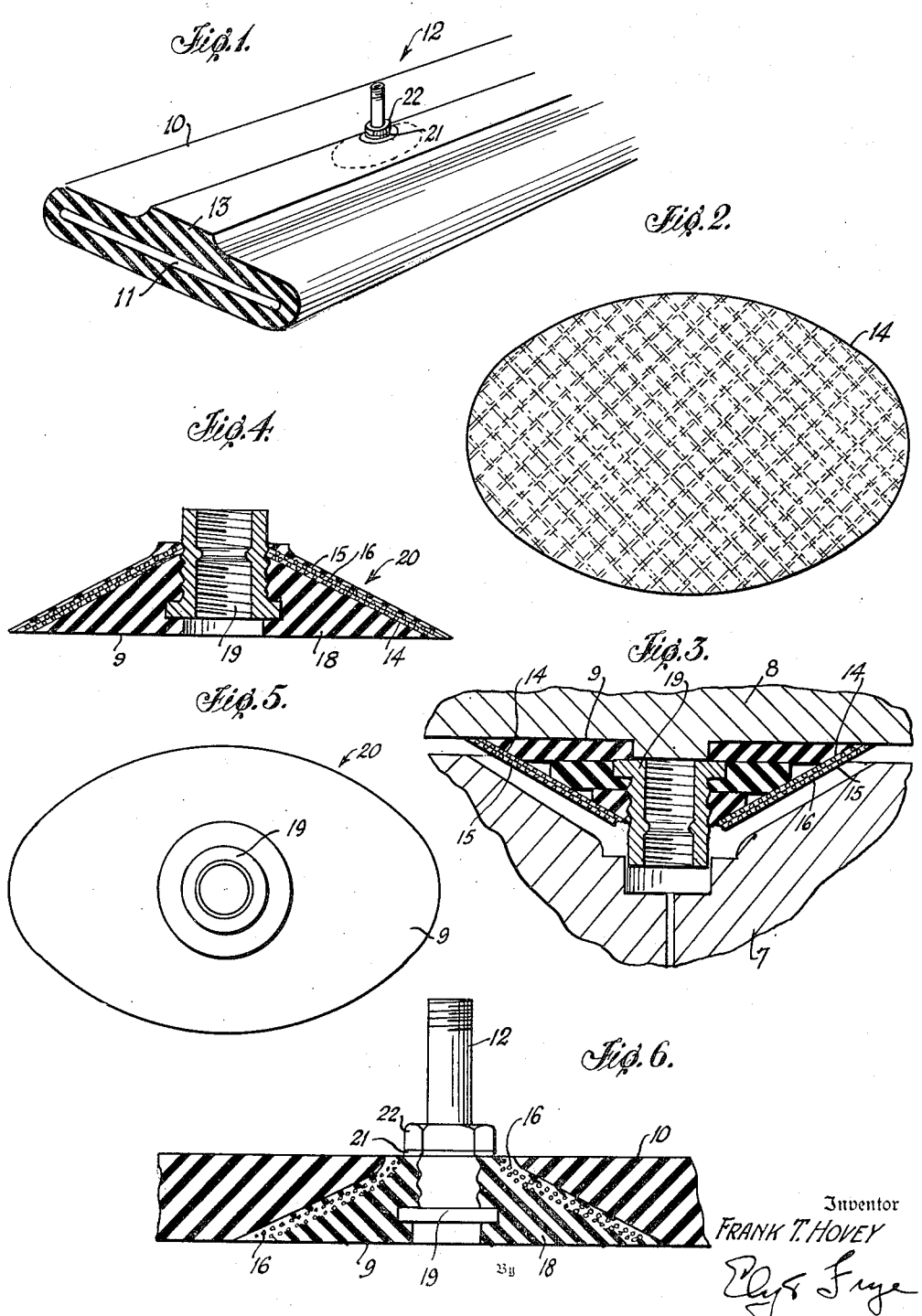
Inventor
FRANK T. HOVEY
Attorneys

Patented Jan. 12, 1954

2,666,007

UNITED STATES PATENT OFFICE 2,666,007

METHOD OF MAKING CURING BAGS

Frank T. Hovey, Akron, Ohio, assignor to The Firestone Tire & Rubber Company, Akron, Ohio, a corporation of Ohio Application January 3, 1950, Serial No. 136,525

1 Claim. (Cl. 154—85)

This invention relates to valved inflatable curing bags and refers particularly to air, inert gasses, water and steam bags for use in curing or vulcanizing pneumatic tires and to method of producing same.

In vulcanizing pneumatic tires, inflatable formers, commonly referred to as full-circle curing bags, are generally used in providing the required internal pressure to force the tire against the tire mold. Such curing bags are expansible endless tubes composed of rubber, or rubber-like material, and are provided with metal inflation valve stems to facilitate the introduction of air, water or other suitable fluid under pressure. The valve stems are secured to the inner or base walls of the curing bags, extending through said walls and have means for attachment thereto, but considerable difficulty has been experienced in effecting a fluid-tight anchorage of the stem in or on the rubber which will continue to be fluid tight through successive tire curing operations. In service, after a curing bag has been used in a tire curing operation, the bag is removed from the cured tire and used in the curing of another tire and in like manner for as many additional tire cures as the condition of the curing bag will permit. Since curing bags are expensive and since a leaking bag may cause a defective tire, it is desirable to get the maximum number of cures from each bag and to overcome the causes of bag failures. One of the most common causes of failures of curing bags is leakage of the inflation fluid along and past the valve stem. This type of bag failure is known as a valve leak. Two methods of combating curing bag valve leaks have been resorted to in the art. One method depends upon obtaining a bond between the rubber and the metal curing bag stem, and the other method to mechanically draw the base of a valve stem against the inside wall of the base portion of the bag thus obtaining a fluid tight seal. Inserting or removing a curing bag from a tire results in extreme distortion of the rubber in the bag walls; however, the metal valve stems are not distorted which results in the rubber prematurely breaking its adhesion or bond to the metal. When a valve leak occurs it may develop during the tire curing operation in which event it is often necessary to classify the tire as defective. A valve leak in a curing bag in which rubber adhesion to the valve stem is employed to prevent leaks usually results in scrapping the bag or at least in building into the bag a new valve stem to replace the old. Building in new stems is expensive and not entirely satisfactory, since bags with replacement or built-in stems often fail before many additional cures have been obtained. Even so, curing bag constructions in which there is adhesion between the rubber and metal valve stems are generally more successful than mechanical valve stems and the present invention is concerned with maintaining the adhesion of the rubber to the valve stems.

A specific object of the invention is to provide a bag construction employing a woven tire reinforcement at the valve stem so disposed as to resist tearing of the rubber adjacent a metal bag stem.

Further and additional objects and advantages will become apparent during the detailed description which is to follow. Referring to the accompanying drawings:

Figure 1 is a perspective view of an end portion of a curing bag showing a valve in position before the bag is vulcanized;

Figure 2 is a plan view of a valve patch as it appears when blanked out from a sheet of rubberized woven wire;

Figure 3 is a sectional view through a valve stem and a fragmentary sectional view of a valve stem mold showing assembled rubber and a valve stem patch as they appear just before the molding of the rubber and patch about the valve stem;

Figure 4 is a sectional view showing the valve stem, rubber and patch of Figure 3 as they appear after molding;

Figure 5 is a top plan view of the assembly of Fig. 4; and

Figure 6 is a fragmentary sectional view of a curing bag embodying one form of the present invention, the stem being shown partly in elevation and partly in section.

The invention has been illustrated in the drawings as applied to a curing bag, which may be formed of butyl or natural rubber compound or of any other suitable material, and which is in the form of a pliable annular tube 10 the interior of which constitutes a fluid chamber 11 into which air, inert gas, steam, water or the like may be introduced through a valve stem indicated generally at 12. The bag 10 is of such a cross sectional configuration when inflated as to conform to the size and shape of the interior of a finished tire. In service the bag is mounted in an unvulcanized tire to provide the internal tire pressure necessary for proper molding and vulcanizing of the tire. It has been found advisable and it is common practice in most sizes of bags to form the inner wall or base 13 of the bag thicker than the other wall portions for reasons well known to those familiar with the art.

By reference to Fig. 6 of the drawing, it will be seen that the bag construction comprises two layers 14 and 15 of wire in the general form of the frustum of a hollow cone built into the base 13 about but spaced from the stem 12. The wire 16 of these layers may be in the form of woven wire or the layers may be composed of separate parallel wires held together by a suitable binder. In any event the layers of wire are embedded in a sheet of rubber preparatory to being incorporated into the structure of the bag. It has been found that a convenient and satisfactory way of rubberizing said wires is by means of a rubber calender by which the layers of wire are rubber coated on both sides. If separate wires are to be used, as for example, strands of .025" gage high carbon wire, such wires are generally simultaneously led from separate spools of a creel through a rubber calender, in spaced parallel relation, in similar fashion as in the method of rubberizing weftless cord tire fabric. The spacing of the cords is substantial, as for example, if .025" gage wire is used the wires are preferably spaced .1". If woven wire is used it is rubberized in similar fashion as used in rubberizing square woven fabric for rubber tires.

After the wire has been incorporated into a sheet of rubber, as just described, oval-shaped blanks in the form of valve stem patches 14 and 15 are cut therefrom. Blank 15 is somewhat smaller than blank 14 and is laid on 14 so as to provide a stepped-down edge to the assembly of wire layers or blanks, which assembly may be pressed into conical form if desired. Preferably the wires 16 are separate and parallel in each said layer with the wires of blank 14 arranged so as to extend at an angle of approximately 90° to the wires of blank 15. It is to be understood, however, that the invention is not to be limited to two layers of wire since more or but one layer has been found to improve the bag construction.

After the blanks of wires 14 and 15 have been plied up as described, rubber 18 is built, in substantially conical shape, in any convenient manner as superimposing a layer of rubber about a base 19 of the valve stem 12. Next the wires at the center of the assembled blanks 14 and 15 are spread apart to form a hole through which the end of valve stem 12 opposite base 19 may be passed. The soft unvulcanized rubber permits the wires 16 to be displaced and it has been found that such displacement may be conveniently done with an awl commonly used in the rubber industry. The hole is made enough larger than the valve stem so that the edges of the hole may be spaced from the valve stem as will be seen by reference to Figs. 4 and 6. Said assembly of blanks 14 and 15 are pressed against the rubber 18 where it will adhere due to the tacky nature of uncured rubber, although rubber cement may be applied to the surfaces of the blanks or the rubber 18 or both if found desirable to increase the adhesive characteristic of the surfaces or the strength of their union after vulcanization. The said assembled blanks are flexible enough to permit them to be pressed against the rubber 18 after which the assembly of valve 12, rubber 18 and blanks 14 and 15 are placed in a vulcanizing mold, having bottom and lid 7 and 8 respectively, and the rubber given only sufficient vulcanization to set the rubber, after which the partially vulcanized valve stem assembly, referred to generally as 20, is removed from said mold and incorporated into the base 13 of curing bag 10 before said bag is vulcanized.

To incorporate the assembly into said base the rubber surface of the molded portions, referred to as 9, of assembly 20 is buffed and cemented and the cement permitted to dry, all in accordance with common practice of preparing rubber surfaces for a permanent vulcanized union to another rubber surface. Next the bag base 13 is cut away in form and amounts to approximately the size and shape of valve stem assembly 20. The cut surface of the base may be cemented or otherwise prepared to receive assembly 20 and to permanently unite thereto, by vulcanization, all in accordance with well-known practices in the rubber industry. Next the assembly 20 is placed in position in said base as indicated in Fig. 1 after which the bag 10 is laid in a curing bag mold and vulcanized, after which a valve washer 21 and nut 22 may be placed on stem 12.

It has been found that the wire reinforcement about the valve stem disposed as described hereinabove is very effective in preventing air, steam, water or other fluid inflation pressure medium from leaking between the valve stem and the rubber, and also prevents the rubber of the base 13 from breaking open near the said stem. This latter fault is a serious problem in curing cord tires and the present invention has been found to have outstanding merit in preventing bag failures from bag bases cracking open or breaking through near the valve stems. Whatever the true explanation may be for the better results obtained from the construction described, it is though that it is due, at least in part, to the following factors:

1. The layers of wire are sufficiently flexible to avoid a region of abrupt change from flexing or distortion of the rubber at the valve stem but rigid enough to resist flexing to a degree that gradually dissipates such distortion.

2. The wire in the reinforcing layers 14 and 15 will not permit air or other internal inflation medium to flow therethrough as in the case of textile cords, thus if a rupture develops from the inside of a curing bag and extends to the wire layers its progress is interrupted and said air or other medium will not leak through the wire.

3. The woven wire or spaced parallel wires 16 provide openings therebetween so that rivet-like rubber extends through layers 14 and 15 and closely surrounds each wire thereby providing an improved union between said wire layers and the rubber body of the curing bag.

4. Heretofore it has been common to reinforce curing bags about the valve stems with textile fabric which were subject to deterioration by the high repeated vulcanizing heat. No such deterioration develops to an objectionable degree in the wire of the present invention.

While, throughout the specification, reference has been made to a valve and a valve stem, it will be understood that these are shop terms used to designate a hollow filling stem, and actually there is no valve included in the stem.

It will now be apparent that an improved curing bag and novel method for producing same have been provided constituting a substantial advance in the art. While the invention has been disclosed as specifically embodied in a curing bag, it is not to be restricted to such use since the salient features may be incorporated in other types of inflatable articles.

Furthermore it is to be understood that the invention is susceptible of modification in the details of construction and arrangement of parts, and the right is herein reserved to invoke such changes as fall within the scope of the appended claim without departing from the spirit of the invention.

What is claimed is:

The method of making a full-circle tire curing bag having a base portion and a metal valve stem which stem includes a barrel and base portion comprising applying uncured rubber compound to said valve stem base and about said barrel adjacent the valve stem base in substantially conical form with the base of said cone-shaped rubber adjacent said stem base, incorporating a layer of wires having openings therethrough into a sheet of uncured rubber, cutting a patch from the combined sheet of rubber and layer of wires, forming a hole in the center of said patch adapted to receive said barrel, attaching said patch free of tension to substantially conical surface of the rubber applied to said valve stem and molding and partially vulcanizing said rubber forming a valve stem head, forming a valve stem opening through said bag base, incorporating said valve stem head in said bag base in said opening and molding and vulcanizing the aforementioned elements into a composite whole.

FRANK T. HOVEY.

References Cited in the file of this patent

UNITED STATES PATENTS

| Number | Name | Date |
| --- | --- | --- |
| 1,270,345 | Tew | June 25, 1918 |
| 1,435,970 | Merrill | Nov. 21, 1922 |
| 1,910,128 | Semler | May 23, 1933 |
| 2,218,639 | Crowley | Oct. 22, 1940 |
| 2,308,268 | Corson | Jan. 12, 1943 |
| 2,318,376 | Crowley | May 4, 1943 |
| 2,476,817 | Charnes | July 19, 1949 |
| 2,564,662 | Baker | Aug. 21, 1951 |